H. D. COLMAN.
SPOOLER.
APPLICATION FILED DEC. 26, 1907.

1,078,574.

Patented Nov. 11, 1913.
11 SHEETS—SHEET 10.

H. D. COLMAN.
SPOOLER.
APPLICATION FILED DEC. 26, 1907.

1,078,574.

Patented Nov. 11, 1913.
11 SHEETS—SHEET 11.

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

SPOOLER.

1,078,574.  Specification of Letters Patent.   Patented Nov. 11, 1913.

Application filed December 26, 1907.  Serial No. 408,111.

*To all whom it may concern:*

Be it known that I, HOWARD D. COLMAN, a citizen of the United States, residing at Rockford, in the county of Winnebago and State of Illinois, have invented certain new and useful Improvements in Spoolers, of which the following is a specification.

This invention relates to the general class of textile machines and more particularly to a spooler.

One of the objects of this invention is to facilitate doffing, the supplying of new bobbins and spools, and the other operations connected with the spooling process. This object I accomplish by causing the spools and the bobbins to travel in a circuit, thus permitting all of the operations above mentioned to be performed at one point in the course traveled by the spools and the bobbins.

Another object of the invention is to simplify the building motion, that is to say, the mechanism for causing the yarn to be wound evenly upon the spools. In the preferred embodiment herein shown I attain this object by providing a stationary, undulating guide rail over which the yarn extends in passing from the bobbins to the spools. In the travel of the spools and the bobbins, said undulating rail causes the yarn to be fed to the spools at constantly and regularly varying heights.

The invention also relates to the other improvements in textile machines hereinafter set forth.

In the accompanying drawings Fig. 2 is a similar view of the end of the machine opposite to that illustrated in Fig. 1.

In the present embodiment of my invention, I have illustrated certain forms of mechanisms for carrying out the generic principles involved, and these mechanisms are shown as being mounted upon a base frame 1 having standards 2 which support the main portion of the frame.

Figure 6:
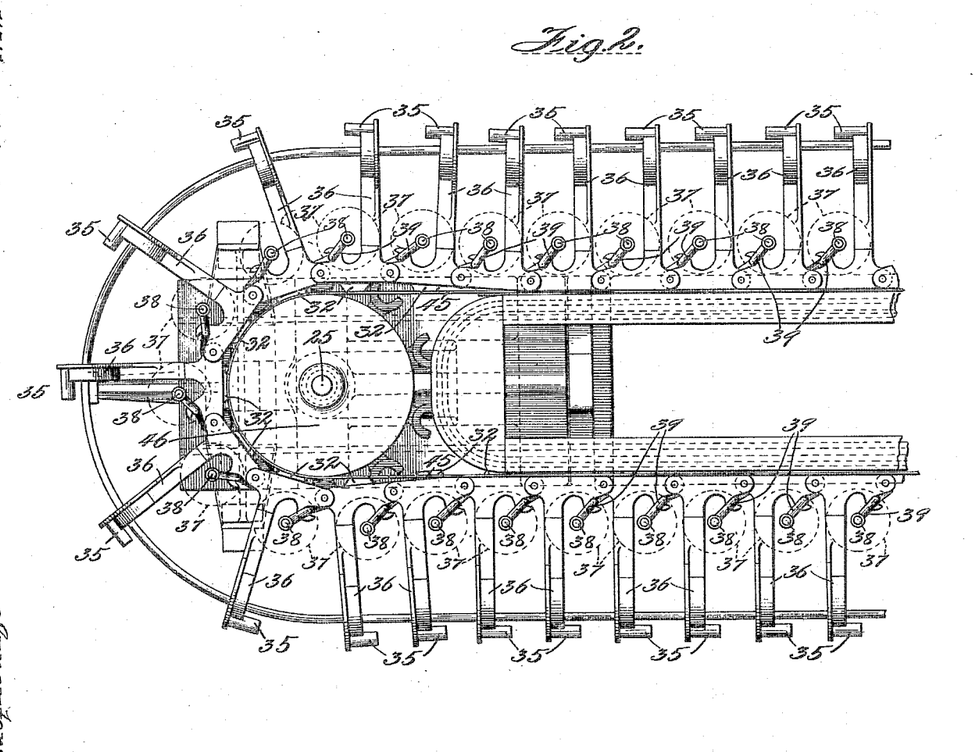
Fig. 6 is a side elevation of the portion of the machine shown in Fig. 1, a portion of the spool and bobbin-carrier being omitted.
Figure 19:
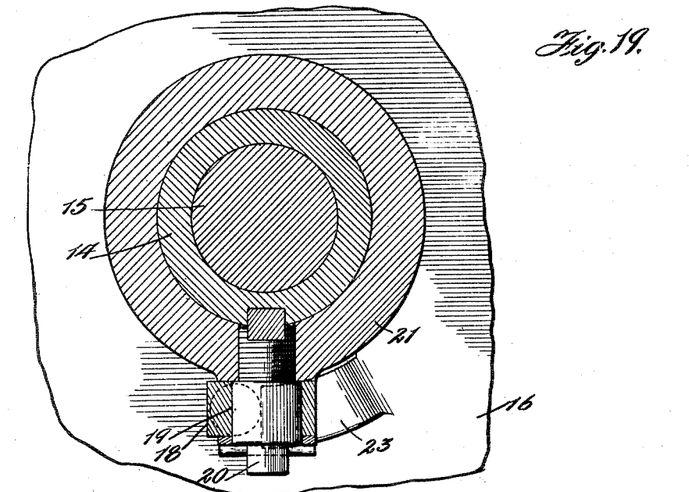
Fig. 19 is a sectional view on the line 19 19 of Fig. 18.

The bobbins and the spools are carried by an endless chain which is continuously driven in one direction, and the spools are rotated by being held in contact with a belt that is driven in the opposite direction. It will be understood, however, that the spool rotating belt might be driven in the same direction as the spool and bobbin carrier, but at a different speed. The means herein shown for driving the spool and bobbin carrier comprises a shaft 3 (Fig. 6) supported upon a standard 4 fixed in the machine frame. The shaft 3 is provided with a gear 5 meshing with a gear 6 fixed on the end of a vertical shaft 7, said shaft being rotatably supported in the standard 4. The lower end of the shaft 7 carries a sprocket 8 over which runs a chain 9 communicating motion to a sprocket 10 fixed on a shaft 11. Upon the latter shaft is rigidly mounted a pinion 12 that meshes with a gear 13 fixed to a sleeve 14 rotatably supported on a spindle 15. Loosely mounted upon the sleeve 14 are sprockets 16 and 17, for driving the spool and bobbin carrier. The sprockets 16 and 17 are caused to rotate with the sleeve 14 through the medium of an equalizer 18 illustrated in Fig. 20, which is provided with an aperture 19 through which a stud 20 may pass so as to fasten the said equalizer 18 to the sleeve 14 (see Fig. 19), the equalizer being rotatable on said stud. The stud 20 also passes through an aperture in a spacing sleeve 21 which is interposed between the sprockets 16 and 17. Studs 22 on the equalizer 18 are adapted to contact with lugs 23 on the sprockets 16 and 17 so as to cause said sprockets to rotate in the direction of rotation of the sleeve 14, and at the same time permit of a slight relative movement between said sprockets. At the opposite end of the machine two sprockets 24 are rotatably mounted upon a fixed vertical shaft 25, said sprockets being alined with the sprockets 16 and 17 and being adapted to support the spool and bobbin carrier.

Upon the base frame 1 is fixed a plurality of frame members 26, a rail 27 being attached to said members at each side of the machine.

Figure 12:
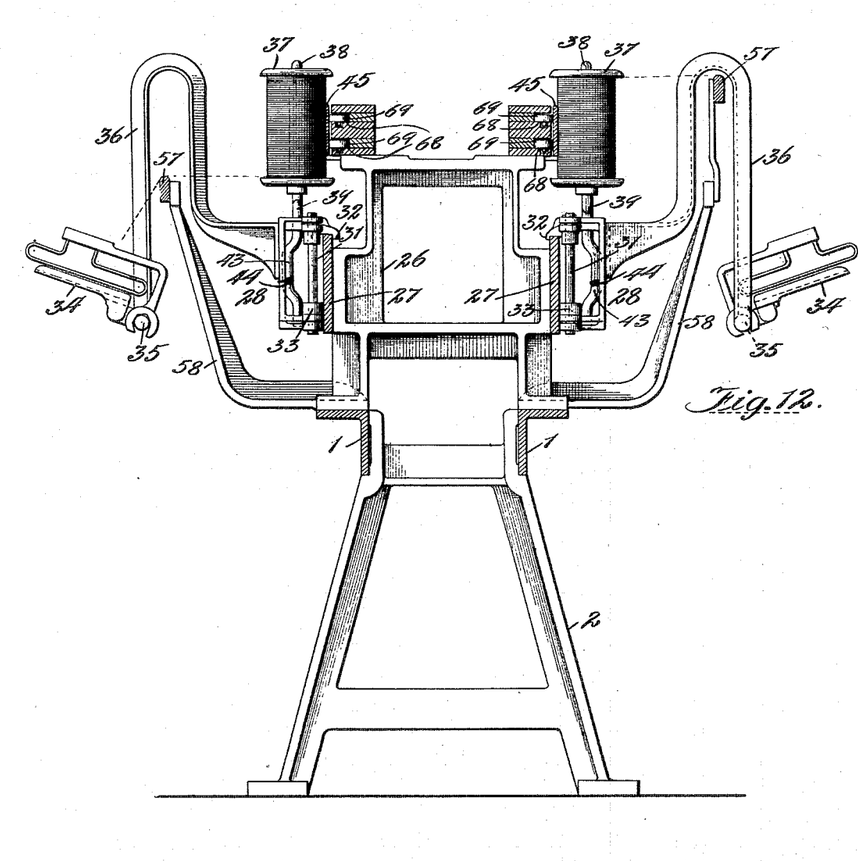
Fig. 12 is a transverse sectional view through the bed frame, the spool holders and bobbin holders being shown in elevation.
Figures 13, 20:
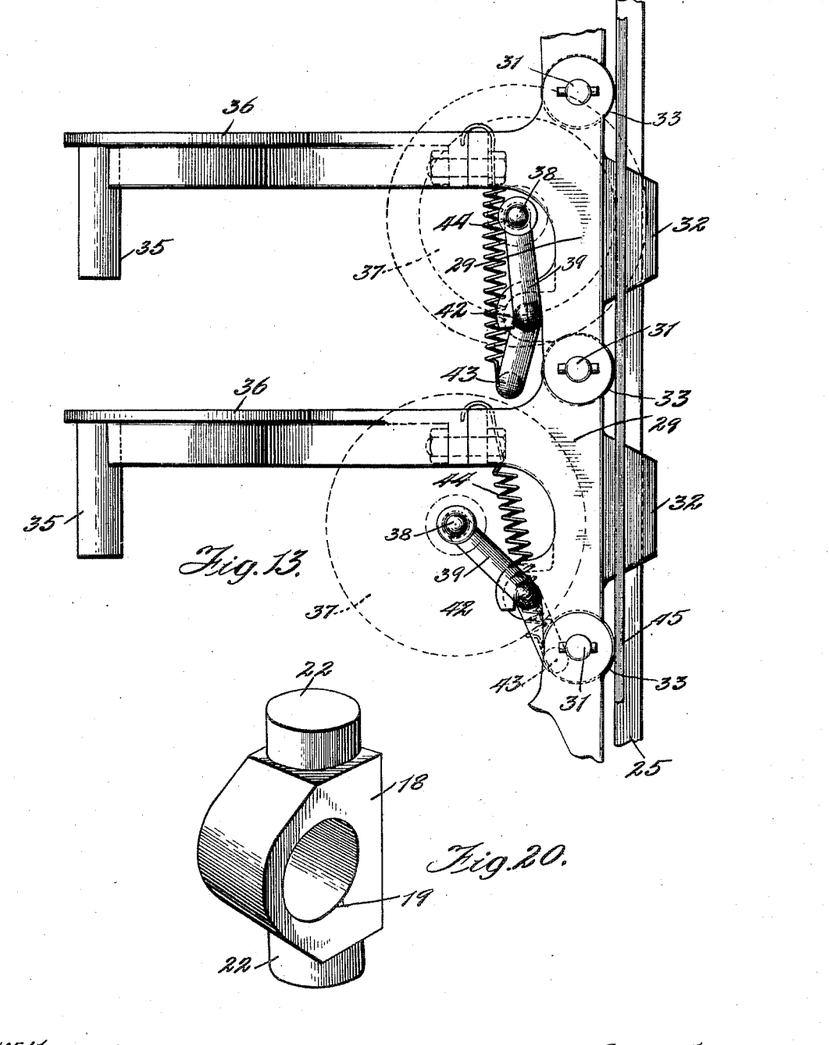
Fig. 13 is a fragmental top plan view of the spool and bobbin carrier.
Fig. 20 is a detail perspective view of the equalizer for the sprockets, forming part of the spool-carrier-actuating mechanism.
Figures 14, 15:
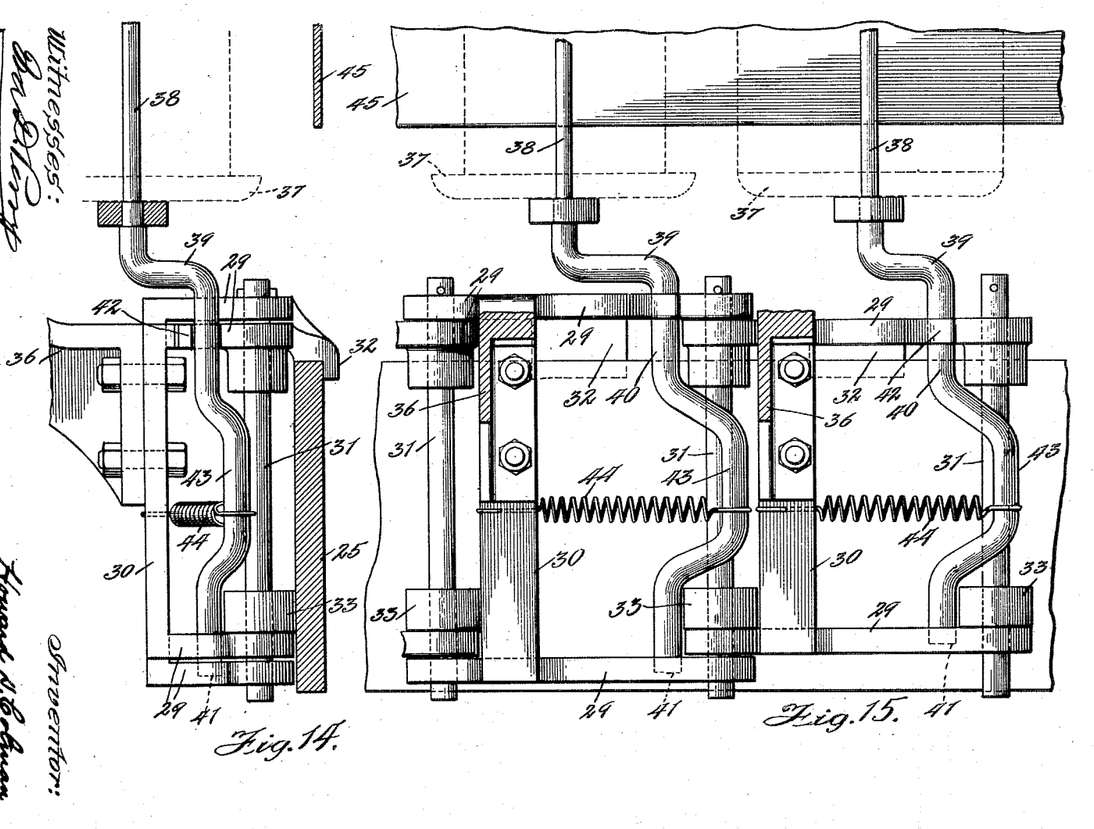
Fig. 14 is a transverse section through said carrier.
Fig. 15 is a side view thereof.

The spool and bobbin carrier comprises a plurality of links 28. Each link comprises two horizontal parallel flanges 29 and a connecting portion 30 (Figs. 13, 14 and 15). The links are connected together to form an endless chain by means of pintles 31 extending through the perforated ends of said flanges. The sprockets 16, 17 and 24 are adapted to engage said pintles for driving the spool and bobbin carrier. Said carrier is supported upon the rails 27 by means of overhanging lips 32 formed upon the upper flanges of the links 28, which lips engage the upper edges of said rails. An antifriction roller 33 rotatably mounted upon each of the pintles 31 bears upon said guide rails. In this instance, the bobbins are carried in bobbin holders 34 (Fig. 12) of any well known or suitable form, each of said bobbin holders being mounted upon a stud 35 extending from a U-shape arm 36 fixed to the connecting portion 30 of each link 28.

Each of the spools 37 is rotatably mounted upon a spindle 38 (Fig. 15) carried by a crank arm 39 of a crank shaft 40, one of said crank shafts being rotatably mounted upon each of the links 28. In this instance, the lower end of the crank shaft is seated in a socket 41 in the lower flange of the link, the upper portion of said shaft lying within an open bearing 42 (Figs. 13 and 14) in the upper flange. Between its ends the shaft 40 is bent to provide a crank portion 43. A coiled spring 44 is attached at one end to said crank portion and at its other end to the connecting portion 30 of the link. The pivotal bearings for the shaft 40 are located between the points of attachment of the spring 44, and, as will be readily seen, said spring tends to hold the crank 43 at one side or the other of a straight line joining the fixed support for the spring and the pivotal supports for said shaft.

Figures 7, 8, 9:
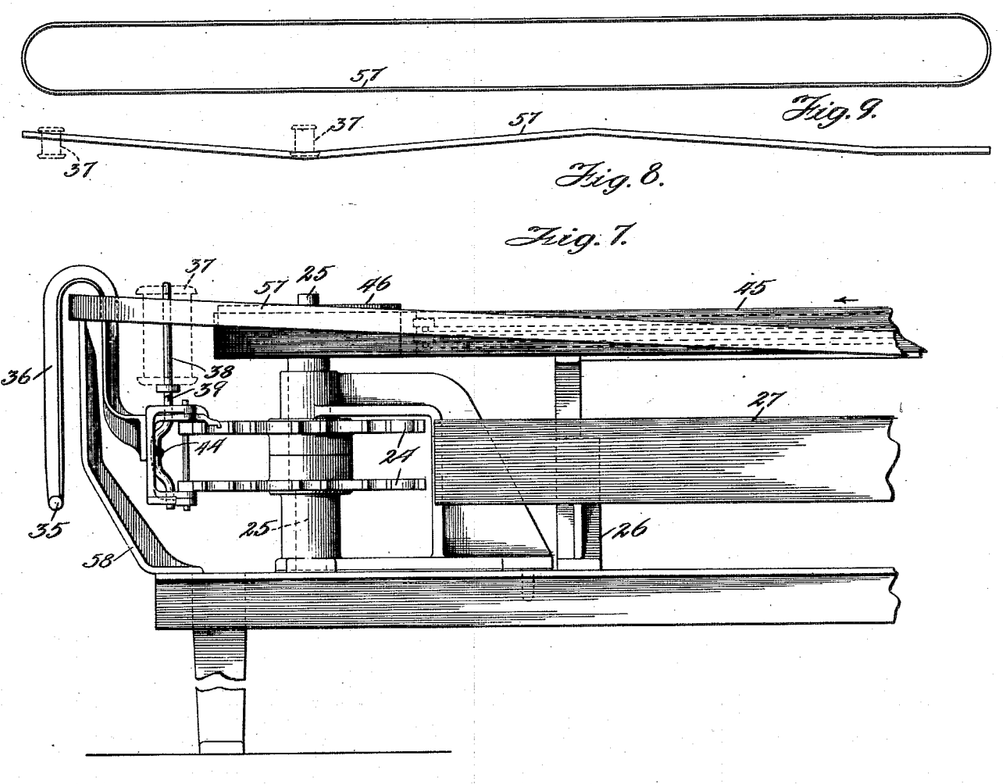
Fig. 7 is a side elevational view of the end of the machine shown in Fig. 2.
Fig. 8 is a side view of a portion of the thread-guiding rail.
Fig. 9 is a plan view thereof.
Figures 10, 11:
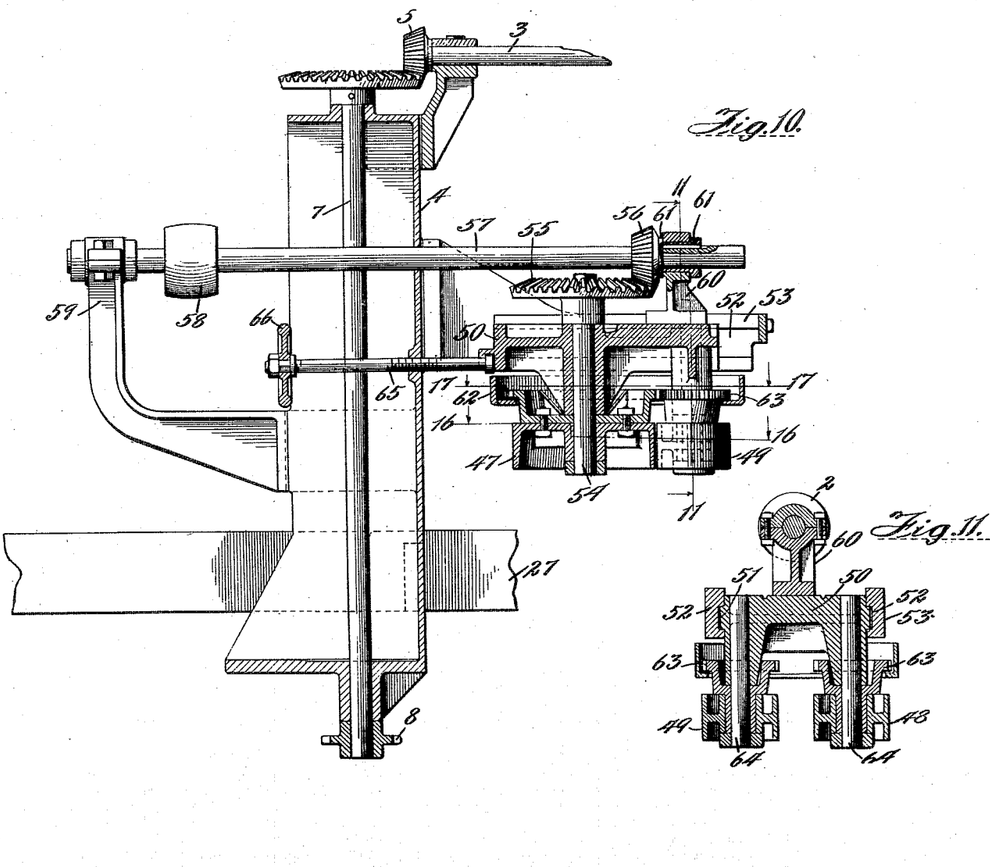
Fig. 10 is a longitudinal sectional view through a portion of the bed frame and the means for tightening the spool-actuating-belt.
Fig. 11 is a sectional view on line 11 11 of Fig. 10.
Figure 16:
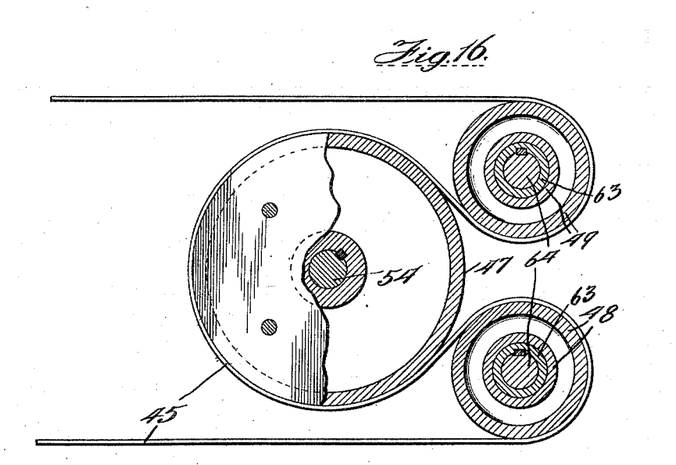
Fig. 16 is a sectional view through the belt pulleys taken on dotted line 16 16 of Fig. 10.
Figure 17:
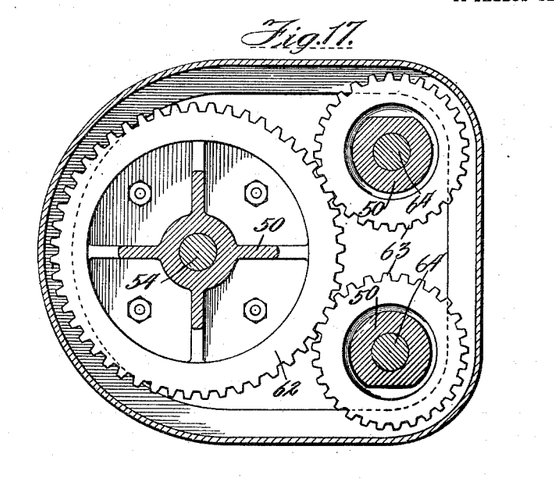
Fig. 17 is a plan view of the belt pulley actuating gears taken on dotted line 17 17 of Fig. 10.
Figure 18:
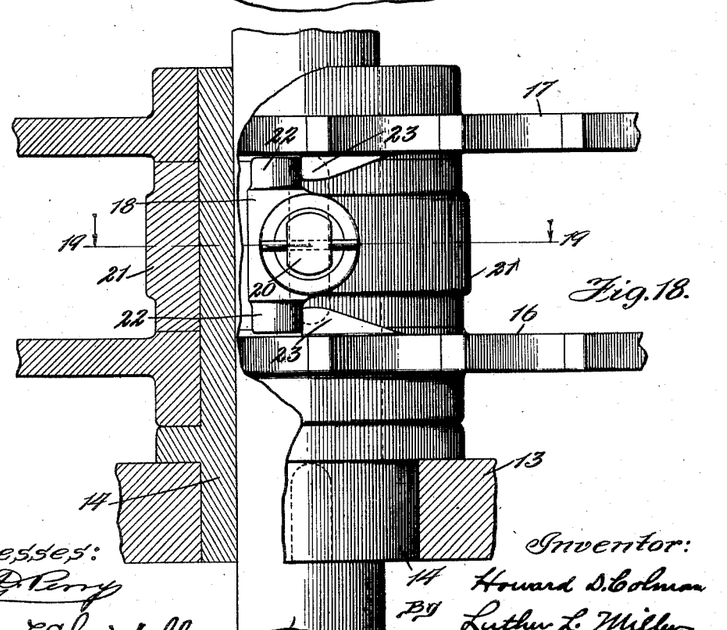
Fig. 18 is a view, partly in section and partly in elevation, of the spool-carrier-actuating mechanism.

The spools 37 are rotated by means of an endless belt 45, which is supported at one end of the machine by a pulley 46 (Fig. 7) rotatably mounted upon the shaft 25. The means herein shown for driving the belt 45 comprises the pulleys 47, 48, and 49 (Figs. 10, 11 and 16), said pulleys being supported in a frame 50, which is movable toward and away from the pulley 46 to take up slack in said belt. In the present instance, the frame 50 has guide ribs 51 thereon which are slidably mounted in guide grooves 52 in a stationary frame 53 supported from the standard 4. In the frame 50 is rotatably mounted a vertical shaft 54 the upper end of which carries a bevel gear wheel 55 meshing with a bevel pinion 56 having a spline connection with a shaft 57. The shaft 57 is rotated by means of a drive pulley 58 fixed thereon. One end of the shaft 57 is carried in a bracket 59 and the other is supported in a bearing 60 fixed to the frame 50. The bevel pinion 56 may be arranged to move with the frame 50 in any desired way, as by means of flanges 61 on the hub of said pinion lying at opposite sides of the bearing 60. The pulley 47 and a gear wheel 62 are fixed to the lower end of the shaft 54, said gear wheel meshing with gears 63 mounted upon shafts 64 in said frame. The pulleys 48 and 49 are each fixed with relation to one of the gears 63. Any suitable means may be provided for adjusting the position of the frame 50, as, for example, a screw 65 having a rotatable connection at one end with the frame 50 and having a screw-thread connection with the standard 4. To one end of the screw 65 is fixed a hand wheel 66.

Figure 3:
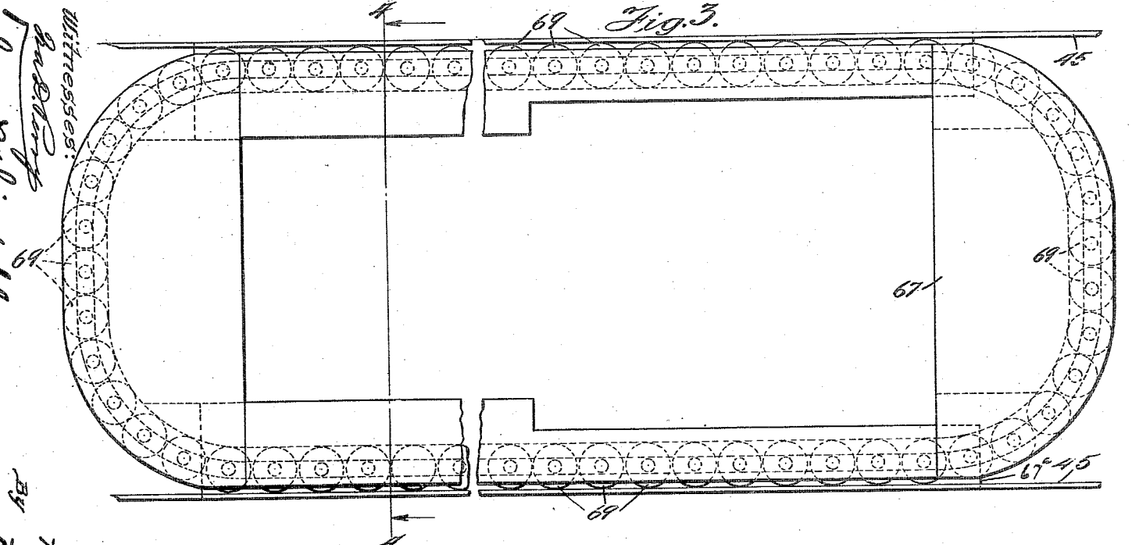
Fig. 3 is a fragmental plan view of the spool-rotating mechanism.
Figure 4:
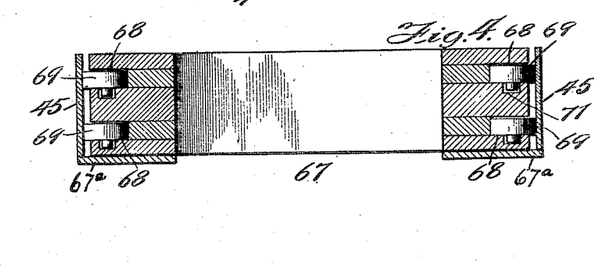
Fig. 4 is a sectional view through the spool-rotating mechanism, the view being taken on the line 4 4 of Fig. 3.
Figure 5:
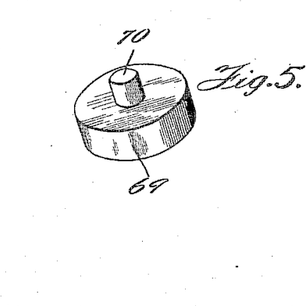
Fig. 5 is a detail perspective view of one of the antifriction devices forming a part of the spool-rotating mechanism.

Between the pulleys 46 and 47 the belt 45 is backed by a frame 67 (Figs. 3 and 4) having two endless raceways 68 therein. In said raceways are mounted antifriction rollers 69 against which the belt 45 bears. Each of the rollers 69 is provided with a journal 70 mounted in a groove 71 formed in the frame 67. Upon opposite sides of the frame 67 between the pulleys 46 and 47 is a ledge or flange 67ª for supporting the belt 45.

The yarn is automatically "built up" on the spools during their travel by means of an endless undulating guide rail 57, which rail may be conveniently supported upon the arms 58. The yarn extends from the bobbins over the guide 57 to the spools. As the spools and bobbins pass around the machine, the thread or yarn will follow the path of the upper edge of the rail 57 and will be fed upon the spool at a point substantially in line with the upper edge of the rail 57 and this will best be understood by reference to Figs. 7, 8, 9 and 12.

Figure 1:
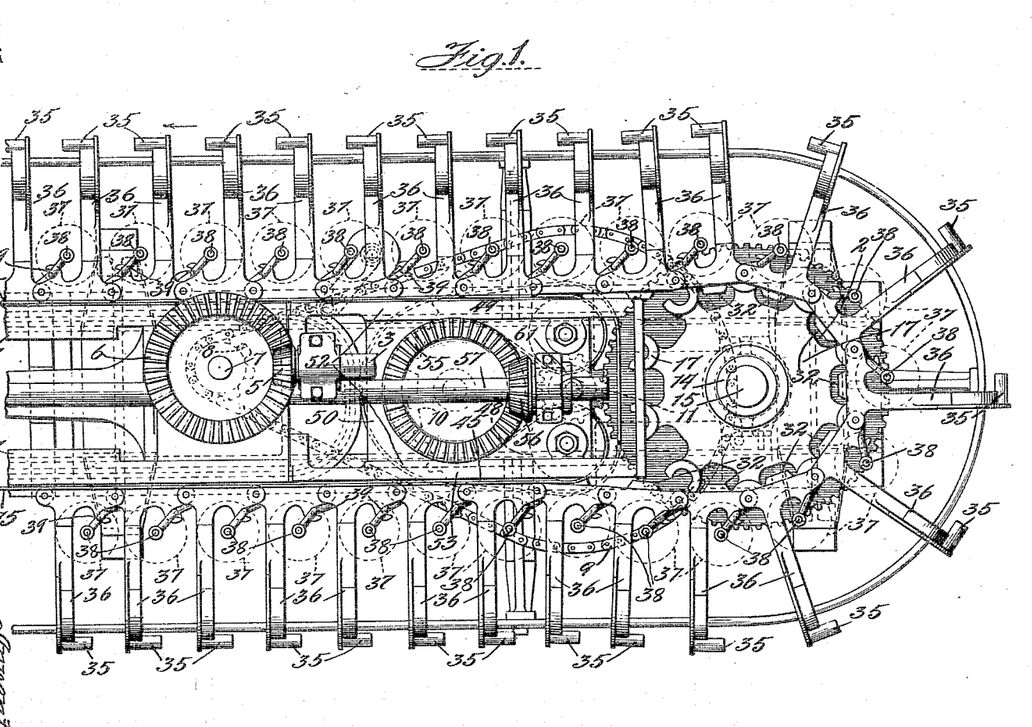
Figure 1 is a fragmental plan view of a machine constructed in accordance with my invention.

The length of the spool and bobbin carrier, the rate of movement of said carrier, and the speed at which the spools are rotated are preferably so proportioned to one another that the bobbins are emptied in one revolution of the spool and bobbin carrier. The bobbins and spools are placed upon the chain and removed therefrom preferably at the end of the machine illustrated in Figs. 1 and 6, and without interruption to the travel of the spool and bobbin carrier. As said carrier travels in the direction of the arrow in Fig. 1, the spools are rotated by the movement of the belt 45 in the direction indicated in said view. In the present embodiment, at the end of the machine shown in Fig. 1, the driving belt 45 does not extend into position to be contacted by the spools while the latter are traveling around said end of the machine. The spools, therefore, stop rotating as soon as they are carried out of contact with the belt 45, thus facilitating the tying on of a new bobbin. Any suitable means may be employed for ejecting the empty bobbins, supplying full bobbins, tying the ends of the yarn on the full bobbins to the empty or partially filled spools, doffing the filled spools, and supplying empty spools.

It will be remembered that each spool is held in driving contact with the belt 45 by a spring 44. As the spool fills, its diameter, of course, gradually increases. The cranks 39 and 43 and the direction of the pull exerted by the spring 44 are arranged so that when the spool is filled to the desired extent the crank 43 will have been moved to the opposite side of a straight line joining the fixed point of support of the spring 44 and the supports for the shaft 40, whereupon said spring immediately and automatically moves the crank 43 in the direction to throw the spool out of contact with the belt 45. The filled spool may be removed from the machine at any desired point and by any suitable means.

The embodiment herein shown is largely illustrative. I recognize the fact that various changes may be made in the form and arrangement of the mechanisms therein employed.

I claim as my invention:

1. A textile machine comprising means for giving a spool a traveling movement; and means for rotating said spool comprising a belt running in a direction opposite to the direction of travel of the spool and operatively engaging said spool.

2. A textile machine comprising means for giving a spool a traveling movement; and a belt running in a direction opposite to the direction of travel of the spool, and arranged to contact said spool.

3. A textile machine comprising an endless continuously driven belt; and means for moving an endless series of thread containers in a direction opposite to the direction of movement of said belt and in driving engagement with said belt.

4. A spooler comprising means for moving a spool in an endless path; means for rotating the spool; and an endless guide for the thread being wound on said spool.

5. A spool-and-bobbin carrier comprising an endless chain, each link of said chain being arranged to support a bobbin and a spool.

6. A spooler comprising an endless spool and bobbin support; an endless belt for rotating the spools; and means for driving the belt and said spool-and-bobbin support in opposite directions.

7. A spooler comprising an endless spool-and-bobbin support; an endless belt for rotating the spools; means for driving the belt and said spool-and-bobbin support in opposite directions; and a stationary endless thread-guiding member.

8. A spool-and-bobbin carrier comprising an endless chain; a spool spindle on each link of said chain; and an arm on each link for supporting a bobbin holder.

9. A spooler having a spool-and-bobbin carrier comprising an endless chain; a spool-support on each link of said chain; an arm attached to each link; a bobbin-support attached to the free end of each arm; means for moving said chain; means for rotating said spools; and an undulating stationary thread-guiding rail.

10. A spooler comprising spool-supporting means and an endless spool-rotating belt; pulleys over which said belt extends, and means for supporting said belt between said pulleys comprising a frame lying between the two runs of said belt, said frame having an endless raceway and a series of antifriction devices freely movable along and filling said raceway, the two runs of said belt running in contact with said antifriction devices.

11. A spooler having a spool-and-bobbin carrier comprising an endless chain and spool and bobbin supports on said chain; wheels for supporting said chain; and a guide rail for supporting said chain intermediate said wheels, said chain having portions adapted to engage said rail.

12. A spooler comprising a supporting framework; an endless belt; means for driving said belt; an endless spool-and-bobbin-support; means for driving said spool-and-bobbin-support, said spool-and-bobbin-support comprising spool-supporting devices arranged to support spools in driving engagement with said belt; and building means in operative relation to the threads extending from the bobbins to the spools.

13. A spooler comprising a supporting framework; an endless belt; means for driving said belt; an endless spool-and-bobbin-support; means for driving said spool-and-bobbin-support, said spool-and-bobbin-support comprising spool-supporting devices arranged to support a spool in driving engagement with said belt; and a stationary build rail located in operative relation to the threads extending from the bobbins to the spools.

14. A spooler comprising a supporting framework; an endless belt; an endless chain; spool supports and bobbin holders carried by said chain, said spool supports being arranged to support a spool in contact with said belt; means for driving said belt and said chain in opposite directions; and an endless undulatory stationary build-rail located in operative relation to the threads extending from the bobbins to the spools.

15. A spooler comprising a member; means for moving said member in a circuit; a bobbin-support on said member; spool-actuating means adjacent to the circuit of said member; a rock shaft carried by said member; an arm on said shaft; a spool spindle on said arm; a crank on said shaft; and a spring acting upon said crank and tending to hold a spool on said spindle in or out of contact with said actuating means.

16. In a spooler, in combination, a spool-and-bobbin carrier comprising an endless chain; means for driving said chain; a spool spindle on each link of said chain; means for rotating spools on said spindles; an arm on each link; a bobbin-holder on the free end of each arm; and an undulatory stationary build-rail over which the threads extend in passing from the bobbins to the spools, said arms being curved to clear said rail.

17. A spooler comprising a series of spool and bobbin carrying devices; means for moving said devices in an endless path, said path having straight parallel sides and curved ends; and a spool-rotating belt supported along the straight sides of said path in position to be contacted by the spools, and supported out of position to be contacted by said spools at one of said curved ends.

18. A textile machine comprising an endless carrier, a series of thread container supports mounted on said carrier, means for rotating the containers, and an endless undulating build-bar adjacent to the path of movement of said carrier, said build-bar being arranged to guide the threads running to the thread containers.

19. A spooler comprising an endless carrier, a series of bobbin and spool supports mounted thereon, means for rotating the spools, and an endless undulating build-bar positioned adjacent to the path of movement of said carrier and between the series of bobbins and the series of spools, said build-bar being arranged to guide the thread running from a bobbin to a spool.

20. A textile machine comprising a traveling thread-container support, means for rotating a thread container mounted on said support to wind thread on said container, and stationary means acting in the travel of the support to cause the thread to be wound evenly on said container.

21. A textile machine comprising a traveling thread-container support, means for rotating a thread-container mounted on said support to wind thread on said container, and a stationary guide bar for the thread running to said container, said guide bar acting in the travel of said support to cause the thread to be wound evenly on said container.

22. A textile machine comprising an endless carrier, thread-container supports mounted on said carrier, and an endless member arranged to rotate the thread containers mounted on said supports, said endless member following the path of movement of said endless carrier and being guided out of operative relation to the thread-container supports at a certain point.

23. A textile machine comprising an endless driving member, an endless carrier following the path of movement of said driving member and extending out of such path of movement at one point, and a series of bobbin and spool holders mounted on said endless carrier.

24. A textile machine comprising an endless driving member, an endless carrier, a series of spool and bobbin supports mounted on said carrier in position to have the spools driven by said endless driving member, said endless carrier being arranged to carry the spool and bobbin supports out of operative relation to said endless driving member.

25. A textile machine comprising an endless driving belt, an endless carrier mounted adjacent to the path of movement of said driving belt, a series of spool and bobbin supports mounted on said carrier, the spools being arranged to be held in driving contact with said belt, and means controlled by the amount of thread wound on the spools for moving the spools out of engagement with said belt.

26. A textile machine comprising an endless belt traveling in one direction, an endless carrier traveling in the opposite direction, and a series of thread containers mounted on said endless carrier in position to engage said belt to rotate said containers.

27. A spooler comprising an endless driving belt, an endless carrier adjacent thereto, a series of spooling supports mounted on said carrier in position to have the spools engage said driving belt, a series of arms mounted on said carrier adjacent to said spool supports, a bobbin holder carried by each of said arms, and means positioned between the bobbin holder and the spool support for guiding the thread extending from one to the other.

28. In a textile machine, the combination of means for giving a spool a traveling movement; means for rotating the spool; and a stationary member extending along the path of movement of the spool and arranged to guide the thread running to the spool.

29. In a textile machine, the combination of means for giving a bobbin and a spool a traveling movement together; means for rotating the spool; and a stationary member extending along the path of movement of said bobbin and spool and arranged to guide the thread running from the bobbin to the spool.

30. In a textile machine, the combination of a series of spool supports and bobbin holders arranged in pairs; means for moving said series in an endless path; and a stationary thread guide over which the thread runs from the bobbins to the spools, said thread guide being arranged to build up the thread on the spool.

31. A textile machine comprising a supporting framework, pulleys rotatably mounted therein, an endless belt running over said pulleys, a pair of ratchet wheels mounted adjacent to said pulleys, an endless chain running on said ratchet wheels, and a series of spool supports mounted on said endless chain in position to have the spools driven by said belt, one of said ratchet wheels being positioned so as to cause the chain to carry the spools out of engagement with said belt.

32. A spool and bobbin carrier comprising an endless chain consisting of links pivoted together, a spool carrying-spindle mounted on each link, an arm mounted on each link, a bobbin support carried by each arm, and means on each link acting upon the spool spindle for moving it into and out of operative position.

33. A spool and bobbin carrier comprising an endless chain, said chain consisting of a plurality of links, each link comprising two horizontally parallel flanges and a connecting portion, the ends of the respective flanges of adjacent links being pivoted together, a spool carrier mounted in the flanges of each link, and a bobbin supporting arm mounted on the connecting portion of each link.

34. A spooler comprising an endless driving member, a traveling endless chain adjacent to said driving member, and spool-carrying means mounted upon each link of said chain, said spool carrying means comprising a shaft rotatably mounted in the chain link, a crank arm on said shaft, a spindle for the spool carried by the crank arm, a second crank arm on said shaft, and a spring acting on the second crank arm to normally hold a spool mounted on said spindle in engagement with said driving member, said spring acting to rotate said crank arm to withdraw the spool from the driving member when a certain amount of thread has been wound on the spool.

35. A spooler comprising a supporting framework, an endless guide mounted thereon, an endless chain mounted upon and guided by said guide, an endless belt mounted adjacent to said guide, and a plurality of thread container supports mounted on said endless chain, said belt being arranged to rotate the thread containers.

HOWARD D. COLMAN.

Witnesses:
W. A. BARBER,
LOUISE A. CULVER.